(12) United States Patent
Belhaj

(10) Patent No.: US 7,068,777 B1
(45) Date of Patent: Jun. 27, 2006

(54) TRUE DTMF DIALER

(75) Inventor: Said O. Belhaj, Coplay, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/288,014

(22) Filed: Apr. 8, 1999

(51) Int. Cl.
*H04M 1/00* (2006.01)

(52) U.S. Cl. .................... 379/357.04; 379/355.02; 379/361; 379/418

(58) Field of Classification Search .............. 379/353, 379/355.06, 356.01, 357.04, 355.02, 361, 379/418
See application file for complete search history.

(56) References Cited

U.S. PATENT DOCUMENTS 3,969,592 A * 7/1976 Pipitone et al. ............. 379/359
4,087,638 A * 5/1978 Hayes et al. ........... 379/357.04

\* cited by examiner

*Primary Examiner*—Jefferey F. Harold

(57) ABSTRACT

A circular dial buffer is implemented in appropriate random access memory (RAM) accessible by a DSP for the purpose of storing DTMF digits to be generated and output on, e.g., a telephone line. To the processor, the DSP appears to behave much like an off-the-shelf stand alone touch tone dialer, with the exception that the DSP does not have access to a keypad input. Instead, in addition to speed dial capabilities, mimicked keypad input is transmitted by a controller to the DSP rather than timing information. Thus, instead of requiring the input of rows and columns or other information relating to button activation on a connected keypad to input touch tone digits, the principles of the present invention allow mimicking of keypad input using commands sent by the controller to the DSP, e.g., a first command indicating that a mimicked, manually operated key is being pressed, and a second command indicating that the mimicked key has been released. Thus, the processor in a processor/DSP telephony system is no longer required to send precisely timed start/stop commands at precise intervals for directing the timing of a DTMF generator implemented in the DSP. Instead, touch tone digit commands may be sent by the processor to the circular dial buffer in the DSP as fast as the processor-to-DSP interface will permit. Accordingly, the present invention provides for the generation of DTMF tone signals from a DSP either based on pre-programmed timing parameters for automatic dialing, but also in accordance with mimicked keypad activity transmitted from the controller to the DSP to affect a true DTMF dialer in the DSP.

15 Claims, 4 Drawing Sheets

TRUE DTMF DIALER

BACKGROUND OF THE INVENTION

1. Field of the Invention

This invention relates generally to dual tone multiple frequency (DTMF) generation. More particularly, it relates to a method and apparatus allowing a processor (e.g., a digital signal processor) to behave as though it is a true dialer capable of seamlessly intermixing keypad input and automatic dialing, without the need for direct access to a keypad.

2. Background of Related Art

Digital telephone devices such as digital telephones and digital telephone answering devices have become commonplace. Such devices typically include a processor (e.g., a controller or microprocessor) for handling overall control of the telephone device, and another processor such as a DSP to handle time intensive tasks such as DTMF tone generation and/or detection.

DTMF tones (i.e., touch tones) are typically used to communicate information, e.g., a telephone number, over a telephone line. At first, external DTMF generator circuits were used to generate touch tone signals. The external DTMF generation circuit has since been replaced in many applications with DTMF generation application software within the code of a digital signal processor (DSP).

Accordingly, DTMF generation has since become a standard feature on many DSPs. In the drive to minimize the bill of materials for a particular system, more and more telephony designers are looking at the DSP to replace expensive external DTMF generators/dialers in products where a DSP is an essential part of the design (e.g., in a telephone answering device and/or a digital speakerphone).

Although the integration of DTMF generation within a DSP has reduced hardware costs, it has caused a substantial amount of cost in the development and handling of software necessary to guarantee that stringent regulatory timing requirements for the transmission of DTMF tones be adhered to. Such timing requirements include the minimum length of each DTMF tone, and the minimum length of the pause between each transmitted DTMF tone.

However, due to the stringent timing requirements of DTMF dialing, what might start as an inexpensive solution has the potential of quickly turning into an implementation nightmare for software engineers.

FIG. 1 shows a conventional system utilizing a controller to pass information to a DSP to generate a specific one of the sixteen or so conventional DTMF tones. For instance, a controller 14 including a timer 14a instructs a DSP 13 including a DTMF generator 11 to output a DTMF tone corresponding to a specific digit on a telephone line 12 through an appropriate telephone line interface 15 until instructed to stop. Thus, to dial a telephone number, the controller informs the DSP digit-by-digit to output DTMF tones corresponding to the telephone number.

Typically, the controller 14 communicates with the DSP 13 via a serial or parallel communication link. In this conventional system, the timing length of each DTMF tone signal, as well as the pauses between each DTMF tone signal, are controlled by the controller 14.

To transmit a DTMF tone signal, the controller 14 sends DTMF signal instructions to the DTMF tone generator 11 in the DSP, e.g. a code from 1 to 16. The DTMF tone generator 11 then processes the instruction by generating an appropriate DTMF tone signal for transmission on the telephone line 12 via a codec (which may be integrated in the DSP 13 or may be external to the DSP 13), and the telephone line interface 15.

However, although the conventional DSP generates DTMF tones on a telephone line, because the DTMF tones are output digit-by-digit, the timing of the output DTMF tones is ultimately controlled by the controller. Thus, the controller is conventionally responsible for maintaining the minimum length of time for each DTMF tone output, and for maintaining a minimum pause time between each DTMF tone output.

The timing complexity in DTMF tone signal generation is illustrated in FIG. 2.

In particular, in step 201, the controller 14 first receives data corresponding to a series of touch tone digits (e.g., a telephone number) from, e.g., a keypad, and transmits tone instructions to the DSP 13 based on the same.

In step 202, the controller 14 instructs the DTMF tone generator 11 in the DSP 13 to start generation of a particular DTMF tone corresponding to a first digit in the touch tone data.

In conventional systems, the controller 14 determines the timing of the DTMF touch tone signals. Thus, in step 203, the controller 14 determines if a minimum amount of time has elapsed, e.g., 100 milliseconds, to establish a minimum length of the DTMF tone signal.

After a sufficient amount of time has elapsed, the controller 14 instructs the DSP 13 to cease generation of the previously requested DTMF tone signal.

Step 206 determines if there are more digits in the touch tone data. If so, the process repeats, but with the controller 14 first ensuring that a minimum off time has elapsed as shown in step 205.

FIG. 2 is shown in simplistic form. In particular applications, the DSP may acknowledge receipt of instructions from the controller 14.

Thus, based on the particular timing requirements for the applicable region or country, the conventional controller 14 must determine and ensure a minimum timing, both as to the length of the DTMF tone and as to the minimum pauses therebetween. Accordingly, conventional digital telephone systems have a timing complexity which is exacerbated by at least two factors. First, the controller may be busy processing other tasks while simultaneously determining the timing of generation of the DTMF signal instructions. Secondly, the DSP may be busy and therefore not be able to send an acknowledgment at the time that the controller determines that the next DTMF signal instruction should be sent, therefore requiring the instruction to be resent. Thus, using current technology, the use of a DSP for DTMF generation is complicated by the fact that either or both a DSP and a controller may be busy with other tasks at the time that the next DTMF tone transmission or tone stoppage should take place.

It would prove to be a fairly expensive item if all the DSP performed was DTMF tone generation. Thus, the DSP includes modules or other software to handle other tasks such as voice compression/decompression. Unfortunately, since the DSP is also used for functions other than generating DTMF, the DSP may be busy at the specific time that the controller desires a DTMF tone to be output.

The conventional controller may output a request to the DSP, then wait for confirmation that the tone is being output. Then, after a sufficient amount of time corresponding to a minimum length for DTMF tone transmission according to regulatory standards, the controller will again communicate with the DSP to request that the tone be stopped.

To avoid excessive wait cycles wherein the controller is merely waiting for the DSP to output a requested DTMF tone, the controller might merely output a DTMF tone request signal to the DSP on a periodic basis, e.g., every 100 millisecond, assuming that the DSP finally got to output the previously requested DTMF tone.

Unfortunately, control of DTMF tone output by one processor for output by another processor inherently includes timing 'jitter' or differences between the length of each DTMF tone and the pauses therebetween, particularly as the workload and interrupt servicing of the DSP increases. Older systems utilizing external DTMF generators did not exhibit these timing differences because conventional DTMF generators were dedicated devices for generating the requested DTMF tones only.

Accordingly, while the microcontroller tries to maintain accurate and consistent digit/pause periods by sending timely start/stop DTMF generator commands to the DSP, often the resulting DTMF digits output to the telephone line do not comply with the regulatory requirements for accuracy and consistency. This is because the DSP is an independent device running independent software algorithms to the microcontroller and its readiness to receive commands as well as command execution speed vary depending on the current task being processed (e.g., background memory management, signal processing, etc.). The problem is worse still in PC telephony applications where the controlling software is unable to keep accurate timing due to the multi-tasking nature of PC processors.

Others have attempted to solve the timing problems associated with dialing using a processor input to a DSP by implementing a speed dial feature. In this implementation, much like a memory telephone, the processor is allowed to store several digit sequences into a reserved portion of random access memory (RAM) in the DSP, typically up to a defined maximum of, e.g., 16 digits for each digit sequence. Digit/pause timing is pre-programmed by the processor.

Using a single command such as "DIAL LOCATION 3", the processor generates accurate and consistent DTMF digit commands to DSP, which in turn generates the DTMF tones on the telephone line consistent with the timing set forth by the processor. Unfortunately, a problem with this solution is that it does not allow for the possibility of manual dialing on a keypad where digits are dialed on the fly, at varying lengths.

There is thus a need for a method and apparatus to free the microprocessor from maintaining timing requirements with respect to dialing.

SUMMARY OF THE INVENTION

In accordance with the principles of the present invention, a tone dialer comprises a dial buffer adapted to contain a plurality of tone generator commands, and a tone generator adapted to generate tones in accordance with a sequence of the plurality of tone generator commands. The tone generator commands include a first command corresponding to a mimicked activation of a particular key, and a second command corresponding to a mimicked release of the particular key.

A method of digitally generating tones in accordance with another aspect of the present invention comprises inputting a plurality of tone commands into a dial buffer accessible by a first processor. A sequence of tone command information is output from the dial buffer to a tone generator. The output sequence of tone command information is sequentially presented to a tone generator. Tones are generated on a fixed timing basis when more than one non-null tone command is available in the dial buffer, and tones are generated on a continuous basis when only one non-null tone command is available in the dial buffer.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention implements a circular dial buffer in appropriate random access memory (RAM) accessible by the DSP (e.g., 16 or 32 bytes minimum) for the purpose of storing and dialing out DTMF digits. Although the DSP can use default digit/pause timings consistent with speed dial techniques, the processor (e.g., microcontroller) is able to customize such parameters to suit the needs of the particular application.

To the processor, the DSP appears to behave much like an off-the-shelf stand alone touch tone dialer, with the exception that the DSP does not have access to a keypad input. Instead, the manual timing associated with keypad input is simulated by the processor in commands to the DSP. Thus, instead of inputting rows and columns or other information relating to button activation on a keypad to input touch tone digits, the principles of the present invention utilize DSP commands sent from the processor to the DSP to mimic manual activation of keys being pressed and released.

Thus, in accordance with the principles of the present invention, the processor in a processor/DSP telephony system is therefore no longer required to send precisely timed start/stop commands at precise intervals for directing the timing of the DTMF generator implemented in the DSP. Instead, touch tone digit commands may be sent by the processor to the circular dial buffer in the DSP as fast as the processor-to-DSP interface will permit.

As implemented in the disclosed embodiment, a DTMF tone generator can be implemented utilizing hardware already present in most digital telephone devices, e.g. a controller and a DSP including a DTMF generator, albeit without requiring the controller to monitor and calculate the timing of the DTMF transmissions from the DSP. Accordingly, the present invention provides for the generation of DTMF tone signals from a DSP either based on pre-programmed timing parameters for automatic dialing, but also in accordance with mimicked keypad activity transmitted from the controller to the DSP to affect a true DTMF dialer in the DSP.

Figure 1:
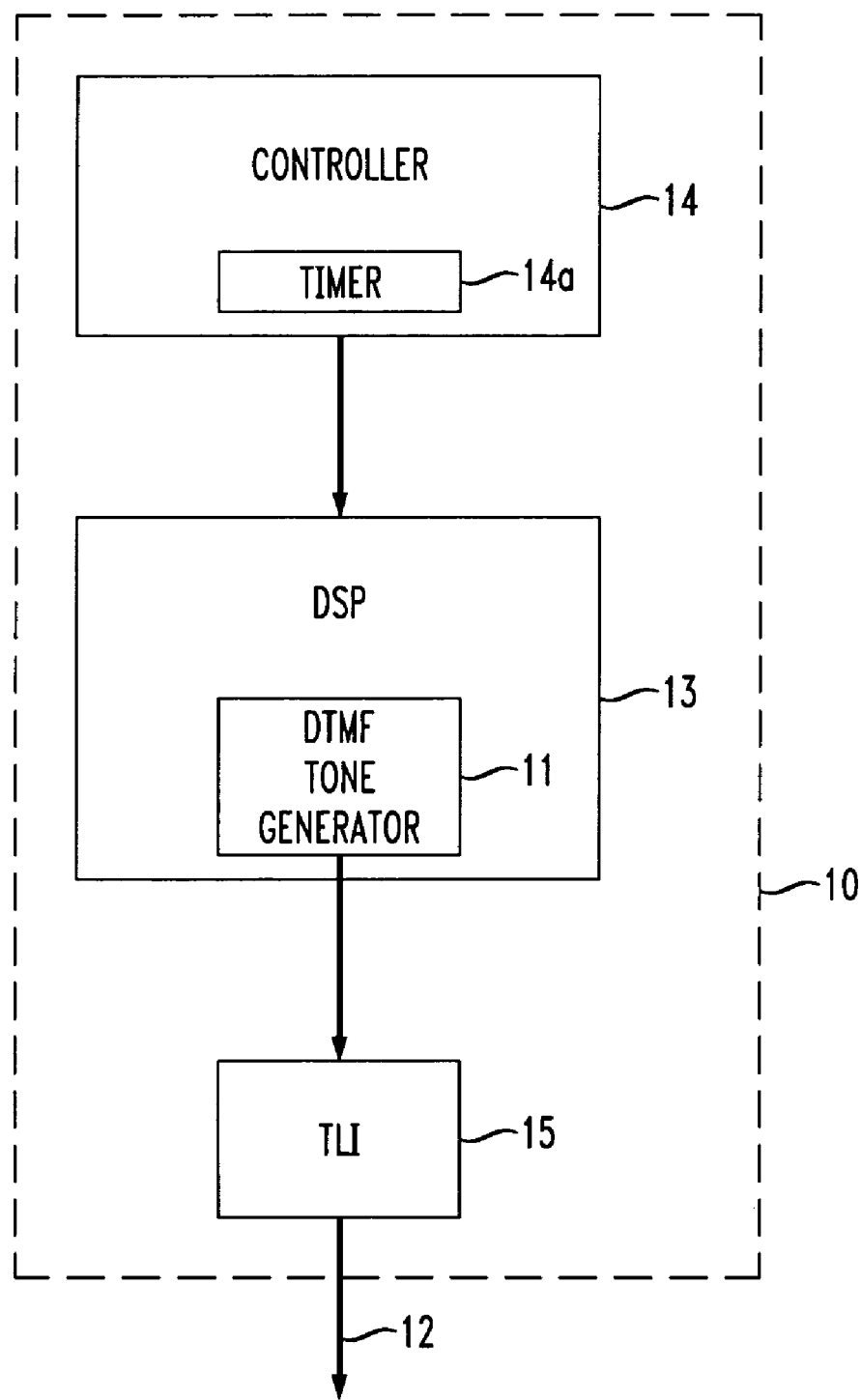
FIG. 1 shows the relevant portion of a conventional digital telephone device with a DSP including a DTMF generator.
Figure 2:
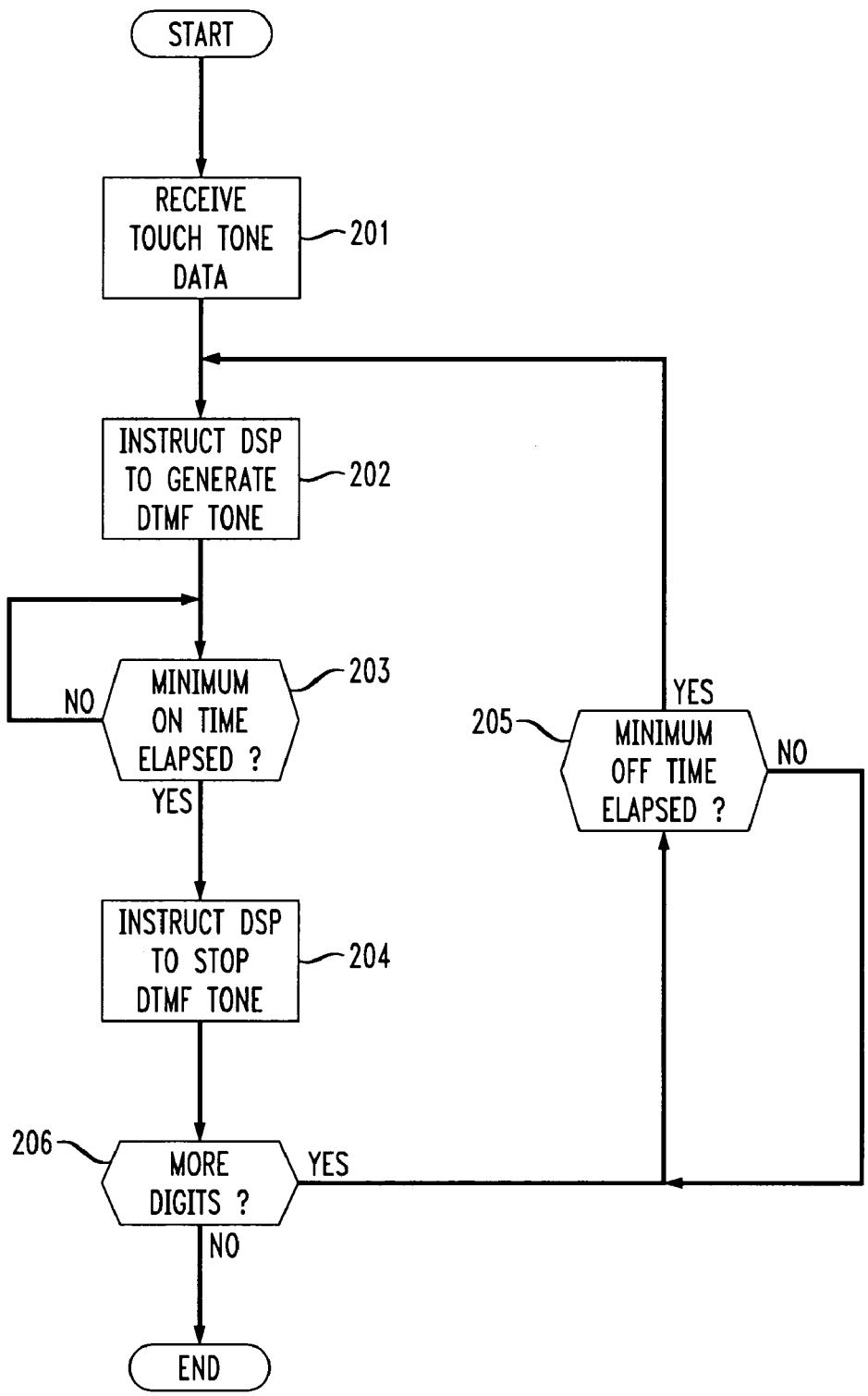
FIG. 2 shows a process of generating DTMF tone signals in a conventional digital telephone device utilizing a DSP including a DTMF generator shown in FIG. 1.
Figure 3:
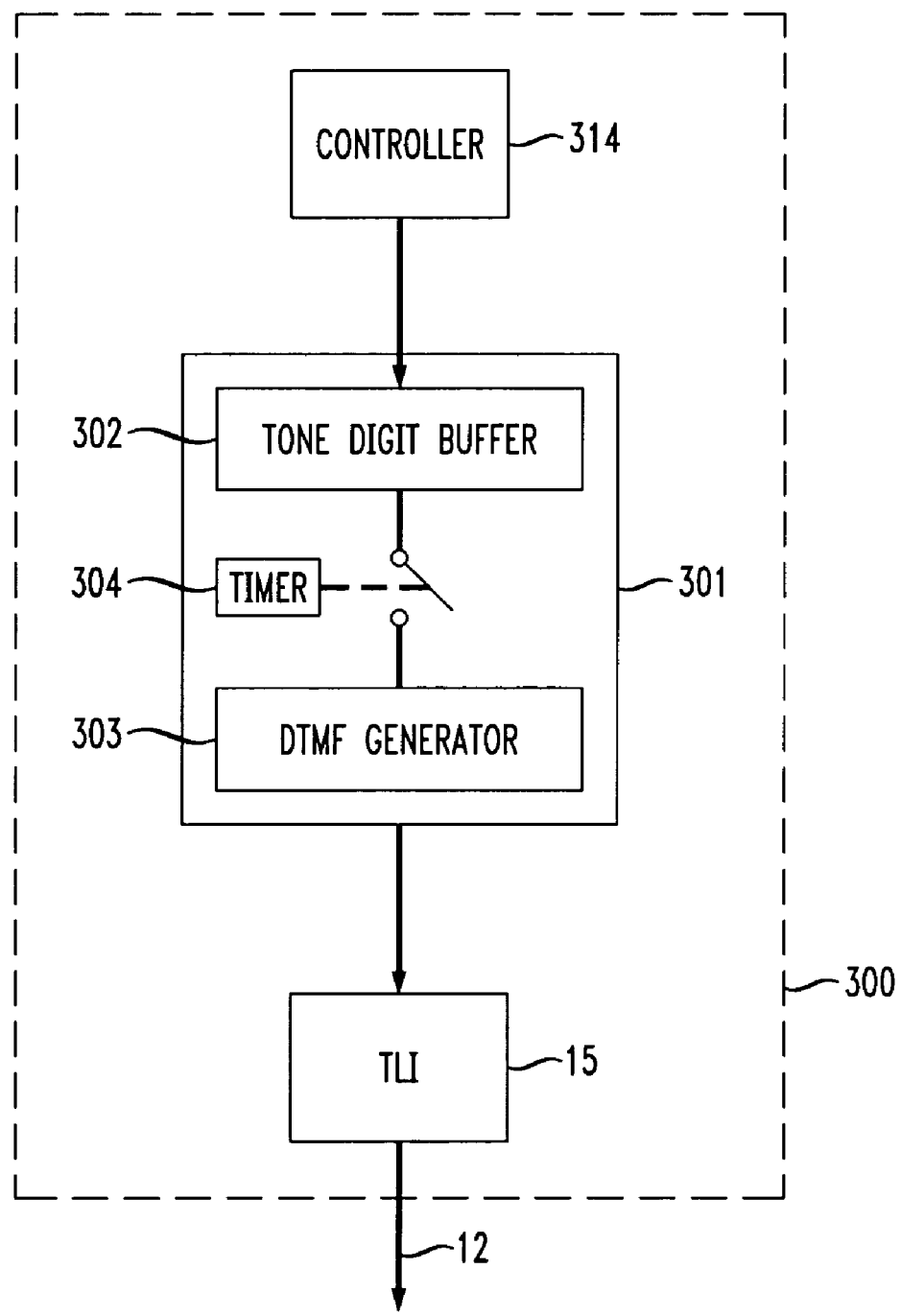
FIG. 3. shows a digital telephone device including a controller and a DSP according to the principles of the present invention.

FIG. 3 shows the relevant portion of a digital telephone device 300 including a controller 314 and a DSP 301. Of course, either processor 314, 301 may be any suitable type processor, e.g., a microcontroller, microprocessor, or digital signal processor.

The controller 314 in FIG. 3 is relieved of the duties of controlling timing of the output of DTMF tone signals, but instead transmits mimicked keypad signals to the DSP 301. The controller 314 need only provide the DSP 301 with data corresponding to one or more DTMF tone signals which are to be generated: the DSP 301 handles the responsibility for the timing both for the length of each output DTMF tone signal as well as the length between each DTMF tone signal. If a current location of a circular dial buffer is filled with a non-null entry, DTMF generation is performed as if in direct response to communication from a manual keypad. If the current location of the circular dial buffer is not filled, i.e., contains a null entry, the DTMF generation maintains the state of the last instruction.

The DSP circular dial buffer maintains a series of touch tone digit data transmitted from the controller 314 to the DSP 301 at any suitable timing. Because the DSP 301 is responsible for the timing of the generated DTMF tone signals between multiple digit information contained in the circular dial buffer, the specific speed and transfer mechanism used between the controller 314 and the DSP 301 is unimportant. For instance, a serial or parallel communication between the DSP 301 and the controller 314 may be utilized.

The DSP 301 further includes a timer 304 which, under the direction of the DSP 301, drives the timing of the generated DTMF tone signals when there is more than one tone digit contained in the circular dial buffer. In the disclosed embodiment, tone digits are read from the tone digit buffer 302 and output to the DTMF generator on a relatively fixed periodic basis, as controlled by the timer 304. While FIG. 3 shows a switch mechanism between the controller 314 and the DTMF tone generator 303, this is for explanation purposes only.

The tone digit buffer 302 in the disclosed embodiment has a fixed length, e.g., 32 bytes. Moreover, in the disclosed embodiment, the tone digit buffer 302 is circular in that it forms a continual first-in, first-out (FIFO) type buffer. Although the controller 314 may write a maximum of, e.g., 32 tone digits into the tone digit buffer 302, as tone digits are generated and completed, freed-up locations in the tone digit buffer 302 may be rewritten to by the controller 314 to queue up additional DTMF tone signals for generation by the DTMF tone generator 303 of the DSP 301.

Figure 4:
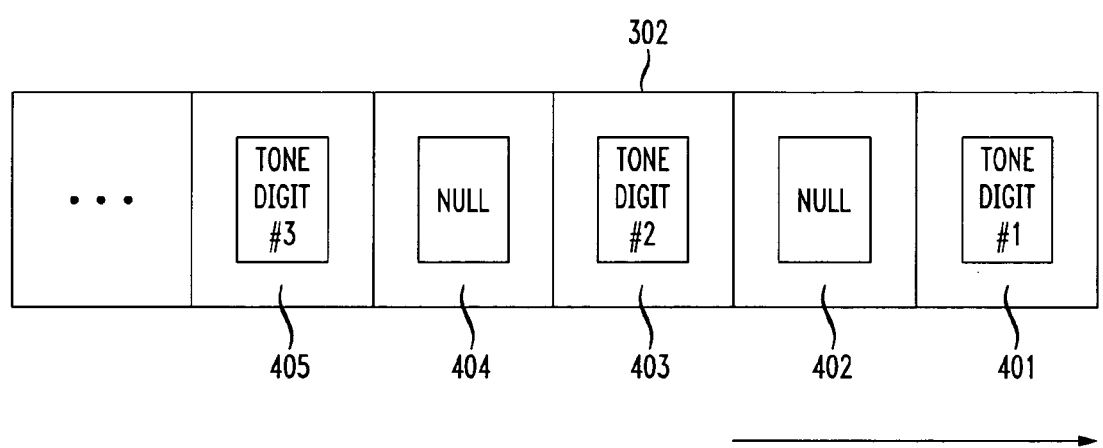
FIG. 4. shows one embodiment of a tone digit buffer in the digital telephone device of FIG. 3.

FIG. 4 shows one embodiment of a tone digit buffer 302 in more detail.

In particular, the tone digit buffer 302 includes rotating or circular slots which are continually directed to the DTMF generator 303 based on a circular addressing scheme, and timing established by the timer 304. For instance, every 100 milliseconds (mS) as determined by the timer 304, the next slot in the tone digit buffer 302 may be presented to the DTMF tone generator 303, to provide relatively fixed and reliable length and spacing for each DTMF tone signal for automatic dialing.

Importantly, the circular dial buffer implements suitable commands interpreted by the DTMF generator 303 in the DSP 301 to allow emulation of a response to a manual keypad input directly to the DSP 301.

For instance, besides the identity of pre-defined tone digits, the circular dial buffer may include an MF_EMPTY, MF_KEY or MF_OFF command from the controller 314 to the DSP 301. These particular command names are arbitrary: any particular command name may be utilized within the principles of the present invention.

The MF_EMPTY command represents an empty tone digit location in the circular dial buffer. The circular dial buffer is initialized with an MF_EMPTY command in each location, e.g., in each of the 32 locations.

The MF_KEY command represents a single key press, mimicking an activation (and continued activation or depression) of a particular key on a key pad.

The MF_OFF command represents a mimicked key release relating to a previous MF_KEY command.

Preferably, the commands or digits are each unique such that the data written into the circular dial buffer alone is sufficient for the DSP 301 to interpret whether the digit represents a particular key, or whether the digit represents a particular command (i.e., MF_EMPTY or MF_OFF used to mimic manual key pad information input to the DSP 301.

The principles of the present invention are embodied in the following example process.

In particular, the exemplary process is made up of two parts. The first part is the scanning of DTMF dialing commands and insertion of desired tone digits into the circular dial buffer in the DSP 301. This is a low priority background task requiring only that the interface between the controller 314 and the DSP 301 be serviced at least once every, e.g., 100 milliseconds (mS) to guarantee that any incoming tone digits are processed and inserted in the circular dial buffer before the circular dial buffer is exhausted.

Step 1) The DSP circular dial buffer is initialized with MF_EMPTY digits each representing an empty buffer. As digits are "pressed" (i.e., as control commands from the controller 314 are transmitted to the DSP 301 mimicking a key activation), the locations in the circular dial buffer containing MF_EMPTY digits are overwritten with the appropriate new digit.

Step 2) During mimicked manual dialing, the controller 314 will write two commands into the circular dial buffer: an MF_KEY command or key representing a single key press, and an MF_OFF command representing a key release.

Step 3) During automatic speed dialing, the controller 314 will send a series of successive MF_KEY commands (digits) representing the desired digits, terminated with an MF_OFF command.

Step 4) The received MF_KEY commands are inserted into the circular dial buffer, and the insert position pointer is incremented to point at the next available insertion location in the dial buffer.

Step 5) MF_OFF commands, representing a key release, are inserted into the circular dial buffer, and the insert position pointer is left unchanged.

As a rule, MF_KEY and MF_OFF commands can overwrite only MF_EMPTY and MF_OFF commands. A buffer full condition with respect to the circular dial buffer is indicated when the next available insertion location in the circular dial buffer is occupied by an MF_KEY digit.

The second part of the process is the dialing of digits to the telephone line by the DSP 301. This is a high priority foreground task which is preferably executed within an interval timer interrupt service routine with a repetition rate faster than 0.5 mS.

Step A) The dialer algorithm monitors the circular dial buffer for the presence of MF_KEY and MF_OFF commands.

Step B) Once an MF_KEY command is found, the DTMF generator 303 is loaded with the desired DTMF parameters, and turned ON to output the desired tone. In the disclosed embodiment, a flag is set to indicate that the DTMF generator 303 is ON, and the digit timer is loaded with the appropriate digit duration. The dialed digit command in the circular dial buffer is replaced with an MF_EMPTY command, and the dial position pointer is incremented to point at the next available dial location in the dial buffer.

Step C) No further action need be taken until such time that the digit time expires.

Step D) If an MF_EMPTY command is found in the next location of the circular dial buffer, then the DTMF generator 303 is left unchanged. This is the case for mimicked manual, continuous DTMF generation.

Step E) The absence of an MF_EMPTY command in the next location of the circular dial buffer indicates that the DTMF generator 303 has to be turned OFF prior to dialing the next digit. Thus, the DTMF generator flag is cleared and the digit timer is loaded with the appropriate pause duration.

Step F) No further action need be taken until such time that the digit time expires.

Step G) If the next available digit in the circular dial buffer is an MF_OFF command, then the digit is replaced with an MF_EMTPY command in the circular dial buffer, and the dial position pointer is incremented to point at the next available location in the circular dial buffer. A response is preferably sent to the controller 314 to indicate the end of dialing.

Thus, the controller 314 starts by sending the first MF_KEY command representing the desired first tone digit. A late response from the DSP 301 to accept the digit at this stage is not critical for DTMF timing. Timing only becomes an issue once the first digit is accepted and the DTMF generator 303 is started. Therefore, so long as the controller 314 keeps sending digit commands to the DSP 301 fast enough to prevent the circular dial buffer from becoming empty, the DSP dialer will be able to maintain the correct, automated DTMF timing for auto-dialing. Once the controller 314 stops sending commands and the dial buffer becomes empty, the dialer will leave the DTMF generator 303 at its last state prior to when the circular dial buffer becomes empty. Thus, if the last command was an MF_KEY command, then the DTMF generator 303 is left ON representing or mimicking a key of a keypad being pressed for an extended amount of time. A subsequent mimicked key release is affected by an MF_OFF command being sent to the DSP 301 from the controller 314, and as a result the DTMF generator 303 stopped.

The particular speed at which the tone digit buffer 302 rotates or circulates may be variable, and can be programmed by the DSP 301 (or initialized by the controller 314). Moreover, every other slot is known to correspond to a null or silent period, and thus the timing can have two aspects: one corresponding to even and one corresponding to odd slot locations. Thus, for instance, the DTMF tone signals can be generated for a longer period of time than the silent periods therebetween, or vice versa.

Similarly, since a silent period is typically desired between each DTMF tone, it can be automatically inserted after each slot in the tone digit buffer 302 to eliminate the need for null locations, e.g., locations 402, 404 shown in FIG. 4.

One feature of the present invention is that the controller 314 may write tone digits corresponding to separate DTMF tone signals at its own pace, independent of the generation timing and spacing of the DTMF tone signals. For instance, if the tone digit buffer 302 is emptied before all desired tone digits are written to by the controller 314, then a 'position' in the circular buffer is left as a null or no DTMF signal.

The DTMF tone generator 303 in the disclosed embodiment can be enabled and disabled such that when enabled, it is fed a continuous stream of tone digit data as timed by the timer 304 until disabled.

When transferring tone digit data to the tone digit buffer 302 of the DSP 301, the controller 314 preferably utilizes conventional handshaking to ensure a reliable communication of the tone digit data. However, blind data transfers may be acceptable in certain applications wherein the controller 314 assumes that once communicated to the DSP 301, that the tone digits are placed in the proper locations in the tone digit buffer 302.

Preferably the tone digit buffer 302 is of suitable length to accept all tone digit data written at any one time by the controller 314. However, an acknowledgment routine may be implemented as between the controller 314 and the DSP 301 to coordinate a delay in transferring tone digit data from the controller 314 to the DSP 301 in the event that the tone digit buffer 302 becomes temporarily full. However, these delays will be minimal because of the circular nature of the tone digit buffer 302, i.e., a slot is freed up every, e.g., 100 mS, based on the timing in the timer 304.

The present invention is particularly useful in applications requiring a long sequence of DTMF tone signals. For instance, in conventional systems wherein the controller 314 is responsible for the generation timing of the DTMF tone signals, long tone sequences would be extremely taxing on the other tasks being performed by the controller 314 and would suffer significantly from timing variances caused by jumping between tasks. In contrast, the present invention provides consistent timing no matter what the length of the tone sequence, and does not affect the performance of other tasks, particularly those operating on the controller 314.

The present invention allows a DSP to become a true DTMF dialer, offering advantageous features such as reduced DSP memory usage when compared with conventional speed dial solutions, savings of external dialer costs, timing independence of the controller, simplified controller code, programmable digit parameters, seamless automatic and/or mimicked manual dialing capabilities, chain dialing and continuous DTMF dialing capabilities.

While the invention has been described with reference to the exemplary embodiments thereof, those skilled in the art will be able to make various modifications to the described embodiments of the invention without departing from the true spirit and scope of the invention.

What is claimed is:

1. A tone dialer, comprising:
   a dial buffer adapted to contain a plurality of tone generator commands; and
   a tone generator adapted to generate dual tone, multi-frequency tones in accordance with a sequence of said plurality of tone generator commands;
   wherein said tone generator commands include a first command corresponding to a mimicked activation of a particular key, and a second command corresponding to a mimicked release of said particular key.

2. A tone dialer, comprising:
   a circular dial buffer adapted to contain a plurality of tone generator commands; and
   a tone generator adapted to generate tones in accordance with a sequence of said Plurality of tone generator commands;
   wherein said tone generator commands include a first command corresponding to a mimicked activation of a particular key, and a second command corresponding to a mimicked release of said particular key.

3. A tone dialer, comprising:
a circular dial buffer adapted to contain a plurality of tone generator commands;
a tone generator adapted to generate tones in accordance with a sequence of said plurality of tone generator commands; and
a timer to time a generated length of tones when said dial buffer contains a plurality of non-null commands
wherein said tone generator commands include a first command corresponding to a mimicked activation of a particular key, and a second command corresponding to a mimicked release of said particular key.

4. A tone dialer, comprising:
a dial buffer adapted to contain a plurality of tone generator commands; and
a tone generator adapted to generate tones in accordance with a sequence of said plurality of tone generator commands;
wherein said tone generator commands include a first command corresponding to a mimicked activation of a particular key, and a second command corresponding to a mimicked release of said particular key; and
when said dial buffer contains no more than one non-null command, said tone generator is adapted to generate said non-null tone until said second command is received.

5. A tone dialer, comprising:
a dial buffer adapted to contain a plurality of tone generator commands; and
a tone generator adapted to generate tones in accordance with a sequence of said plurality of tone generator commands;
wherein said tone generator commands include a first command corresponding to a mimicked activation of a particular key, and a second command corresponding to a mimicked release of said particular key; and
said dial buffer and said tone generator are comprised in a single processor device.

6. A tone dialer, comprising:
a dial buffer adapted to contain a Plurality of tone generator commands; and
a tone generator adapted to generate tones in accordance with a sequence of said plurality of tone generator commands;
wherein said tone generator commands include a first command corresponding to a mimicked activation of a particular key, and a second command corresponding to a mimicked release of said particular key; and
said single processor device is a digital signal processor.

7. A tone dialer, comprising:
a first in, first out dial buffer adapted to contain a plurality of tone generator commands; and
a tone generator adapted to generate tones in accordance with a sequence of said plurality of tone generator commands;
wherein said tone generator commands include a first command corresponding to a mimicked activation of a particular key, and a second command corresponding to a mimicked release of said particular key.

8. A tone dialer, comprising:
a dial buffer adapted to contain a plurality of tone generator commands; and
a tone generator adapted to generate tones in accordance with a sequence of said Plurality of tone generator commands;
wherein said tone generator commands include a first command corresponding to a mimicked activation of a particular key, and a second command corresponding to a mimicked release of said particular key; and
said dial buffer is adapted to contain a stop DTMF tone generator command in every other location.

9. A method of digitally generating tones, comprising:
inputting a plurality of tone ON commands into a dial buffer accessible by a first processor;
inputting a plurality of tone OFF commands into said dial buffer; and
sequentially presenting an output sequence of tone command information based on a sequence of said tone ON commands and said tone OFF commands in said dial buffer, to a dual tone, multi-frequency tone generator.

10. A method of digitally generating tones, comprising:
inputting a Plurality of tone ON commands into a dial buffer accessible by a first processor;
inputting a Plurality of tone OFF commands into said dial buffer;
sequentially presenting an output sequence of tone command information based on a sequence of said tone ON commands and said tone OFF commands in said dial buffer, to a tone generator; and
generating tones on a fixed timing basis when more than one tone ON command is available in said dial buffer.

11. Apparatus for digitally generating tones, comprising:
means for inputting a plurality of tone ON commands into a dial buffer accessible by a first processor;
means for inputting a plurality of tone OFF commands into said dial buffer; and
means for sequentially presenting an output sequence of tone command information based on a sequence of said tone ON commands and said tone OFF commands in said dial buffer, to a dual tone, multi-frequency tone generator.

12. Apparatus for digitally generating tones according to claim 11, wherein, comprising:
said first processor is a digital signal processor.

13. Apparatus for digitally generating tones according to claim 12, wherein, comprising:
said digital signal processor includes a tone generator.

14. Apparatus for digitally generating tones according to claim 12, wherein, comprising:
said dial buffer is circular.

15. Apparatus for digitally generating tones, comprising:
means for inputting a plurality of tone ON commands into a dial buffer accessible by a first processor;
means for inputting a plurality of tone OFF commands into said dial buffer;
means for sequentially presenting an output sequence of tone command information based on a sequence of said tone ON commands and said tone OFF commands in said dial buffer, to a dual tone, multi-frequency tone generator; and
means for generating tones on a fixed timing basis when more than one tone ON command is available in said dial buffer.

* * * * *